United States Patent [19]

Uehara et al.

[11] Patent Number: 5,452,349
[45] Date of Patent: Sep. 19, 1995

[54] CALL FORWARDING CONTROL SYSTEM FOR ISDN

[75] Inventors: Takeshi Uehara; Tohru Tachibana, both of Kawasaki, Japan

[73] Assignee: Fujitsu Limited, Kanagawa, Japan

[21] Appl. No.: 52,393

[22] Filed: Apr. 23, 1993

[30] Foreign Application Priority Data

Apr. 24, 1992 [JP] Japan .................. 4-105151

[51] Int. Cl.⁶ .................................. H04M 3/54
[52] U.S. Cl. ................... 379/211; 379/234; 379/201; 379/96; 370/110.1
[58] Field of Search .......... 379/210, 211, 212, 201, 379/93, 94, 96, 234, 221, 220, 229, 231, 207; 370/110.1

[56] References Cited

U.S. PATENT DOCUMENTS

| | | | |
|---|---|---|---|
| 4,723,273 | 2/1988 | Diesel et al. | 379/211 |
| 4,893,336 | 1/1990 | Wuthnow | 379/211 |
| 5,023,868 | 6/1991 | Davidson et al. | 379/211 |

*Primary Examiner*—Ahmad Matar

[57] ABSTRACT

A call forwarding control system for use in a communication system which includes at least two terminals connected to a first network and at least two terminals connected to a second network which is coupled to the first network where the second network is an integrated services digital network and the first network is a public network. The call deflection control system being included within the second network. The call forwarding control system includes a forwarding accepter part for accepting a call forwarding request from a terminal of the second network upon that terminal receiving a call from a terminal of the first network. A judging part is included in the control system for judging whether the call forwarding request is a call forwarding to a terminal of the first or second network. A call forwarding execution part connected to the judging part executes a call forwarding to a terminal of the second network when the judging part judges that the call is to be forwarded to a terminal in the second network. A call forwarding request part requests the first network to execute the call forwarding when the judging part determines that the forwarding request is to a terminal of the first network.

11 Claims, 15 Drawing Sheets

CALL FORWARDING CONTROL SYSTEM FOR ISDN

BACKGROUND OF THE INVENTION

The present invention generally relates to call forwarding control systems, and more particularly to a call forwarding or call diversion control system for realizing a call forwarding function when connecting an integrated services digital network (ISDN) line and an ISDN terminal to a speech channel system.

When a private network made up of an ISDN is connected to a public network, there are cases where a call to the private network from a terminal of the public network is to be forwarding to another terminal of the public network. In such cases, it is desirable that the call forwarding function of the private network can be made without the need to use a new information channel of the ISDN line nor to make a switching control.

FIG. 1 shows an example of a conventional call forwarding control system. In FIG. 1, a main network 11 such as a public network is coupled to a private branch exchange (PBX) 14 via a T-point of an ISDN line. Terminals 12 and 13 of the public network 11 are coupled to the public network 11. A terminal 15 of the PBX 14 is coupled to the PBX 14 via a S-point of the ISDN line. The terminal 15 includes a call forwarding request part 21 for requesting a call forwarding at the terminal 15. In addition, the PBX 14 includes a call forwarding accept part 31 which accepts a call forwarding, and a call forwarding execution part 32 which executes the call forwarding.

For example, assume that the terminal 15 is called from the terminal 12 via the public network 11, an information channel 16 and the PBX 14, and that the terminal 15 is to forward this call to the other terminal 13 of the public network 11. In this case, the call forwarding request part 21 of the terminal 15 makes a call forwarding request to the PBX 14 by specifying a number of the terminal 13 as a forwarding destination number. The call forwarding accept part 31 of the PBX 14 accepts the call forwarding request and carries out a call control depending on the forwarding destination number. The call forwarding execution part 32 of the PBX 14 captures a new information channel 17 which is different from the information channel 16 to which the call is received from the terminal 12, and carries out a switching control using the new information channel 17. Hence, the call forwarding execution part 32 makes a call setup with respect to the terminal 13 via the public network 11 according to the forwarding destination number, so that a desired call forwarding is made by forming an information path between the called information channel and the new information channel 17.

According to the conventional call forwarding system for the private network, it is necessary to use a new information channel and to carry out a switching control when making a call forwarding to the other network, that is, the public network. Therefore, there were problems in that two information channels (ISDN lines) must be used at the T-point and that the private network must carry out the switching operation.

Next, a description will be given of the operation of the conventional call forwarding control system, by referring to the time charts of FIGS. 2 and 3. The time charts shown in FIGS. 2 and 3 show the procedure of the general point-to-multi-point connection interface.

First, if a user B of the public network 11 calls a user A at an extension of the PBX 14, a call setup (SETUP) is sent from the user B to the user A via the public network 11 and the PBX 14 as shown in FIG. 2. The call setup (SETUP) includes a call reference number (CR1), a bearer capability (BC) and a channel number (CH). The public network 11 returns a call proceeding (CALL PROC) to the user B in response to the call setup (SETUP). The PBX 14 returns a call proceeding (CALL PROC) to the public network 11 in response to the call setup (SETUP). In addition, the user A returns a call proceeding (CALL PROC) to the PBX 14 in response to the call setup (SETUP).

Second, the user A generates a call forwarding (CD1), that is, a call forwarding request. If a call forwarding is to be made to a user C, the user A sends an added information message (INFO) which includes a feature activation information element (FA[CD1]) and a keypad information element (KP[forwarding destination number]), so as to activate the call forwarding (CD1) with respect to the PBX 14. In FIGS. 2 and 3, a black circle indicates the inactive state in which the call forwarding feature lamp is OFF, and a pair of overlapping circles indicates executing state in which the call forwarding feature lamp slowly flashes. The user A sends the added information message (INFO) to the PBX 14 by adding the call reference number, the service request (FA[CD1]) of the call forwarding and the keypad number (KP), that is, the forwarding destination number. The PBX 14 sends a call setup (SETUP) to the public network 11 in response to the received added information message (INFO) from the user A, and the public network 11 sends the call setup (SETUP) to the user C.

Third, the PBX 14 sends to the user A a release message (REL) by adding the call reference number, the feature indication (FI) and the call forwarding display (DSP[DSP1]), where DSP denotes a display information element, DSP1 denotes a display information field, and the content of the display information field DSP1 is "starting forwarding", for example. The user A assumes the executing state (that is, slow flashing of the call forwarding feature lamp) in response to the release message (REL). In addition, the PBX 14 sends a release message (REL) to a user D who is other than the user A by adding the call reference number-and a disconnect/restoration cause (CAUSE [#26]) of the user who was not selected. The user A returns a release complete (REL COMP) to the PBX 14 by adding the call reference number. Further, the user D who is other than the user A also returns a release complete (REL COMP) to the PBX 14 by adding the call reference number.

Fourth, the user C sends an alert (ALERT) to the public network 11 as shown in FIG. 3, and the public network 11 sends an alert (ALERT) to the PBX 14. Hence, the PBX 14 returns an alert (ALERT) to the public network 11, and the public network 11 sends an alert (ALERT) to the user B. At the same time, the public network 11 sends a ring back tone (RBT) to the user B.

Fifth, if the user C lifts the receiver and a connection is made, a connect (CONN) is returned to the public network 11. Hence, the public network 11 sends a connect (CONN) to the PBX 14

Sixth, the public network 11 returns a connect acknowledge (CONN ACK) to the user C. On the other hand, the PBX 14 returns a connect acknowledge (CONN ACK) to the public network 11, and sends a connect (CONN) to the public network 11. In addition, the public network 11 sends a connect (CONN) to the user B to notify that the connection for the deflection has been made. The public network 11 then returns a connect acknowledge (CONN ACK) to the PBX 14, and the user B returns a connect acknowledge (CONN ACK) to the public network 11. Thereafter, a communication is made between the users B and C via the public network 11 and the PBX 14.

Therefore, in addition to the problems described above, it may be seen from FIGS. 2 and 3 that the conventional call forwarding control system provides no means for turning OFF the call forwarding feature lamp at the user A. Furthermore, the conventional call forwarding control system provides no means for notifying the user A upon the completion of the call forwarding operation.

SUMMARY OF THE INVENTION

Accordingly, it is a general object of the present invention to provide a novel and useful call forwarding control system for ISDN, in which the problems described above are eliminated.

Another and more specific object of the present invention is to provide a call forwarding control system adapted to a communication system which includes at least two terminals connected to a first network and at least one terminal connected to a second network which is coupled to the first network, where the second network is an integrated services digital network and the call forwarding control system comprises a call forwarding accept means accepting a call forwarding request from the terminal of the second network, judging means, coupled to the call forwarding accept means, for judging whether the call forwarding request accepted by the call forwarding accept means is a call forwarding request to the first or second network, call forwarding execution means, coupled to the judging means, for executing a call forwarding to the second network depending on a judgement result of the judging means, and a call forwarding request means, coupled to the call forwarding accept means, requesting a call forwarding to the first network depending on the judgement result of the judging means. According to the call forwarding control system of the present invention, it is possible to make the call forwarding without using the information channel on the T-point side when controlling the ISDN call forwarding. In addition, no switching control is required in the second network (PBX). Therefore, it is possible to improve the utilization efficiency of the information channel and simplify the switching control of the second network.

Other objects and further features of the present invention will be apparent from the following detailed description when read in conjunction with the accompanying drawings.

DESCRIPTION OF THE PREFERRED EMBODIMENTS

First, a description will be given of one aspect of the present invention, by referring to FIG. 4.

Figure 4:
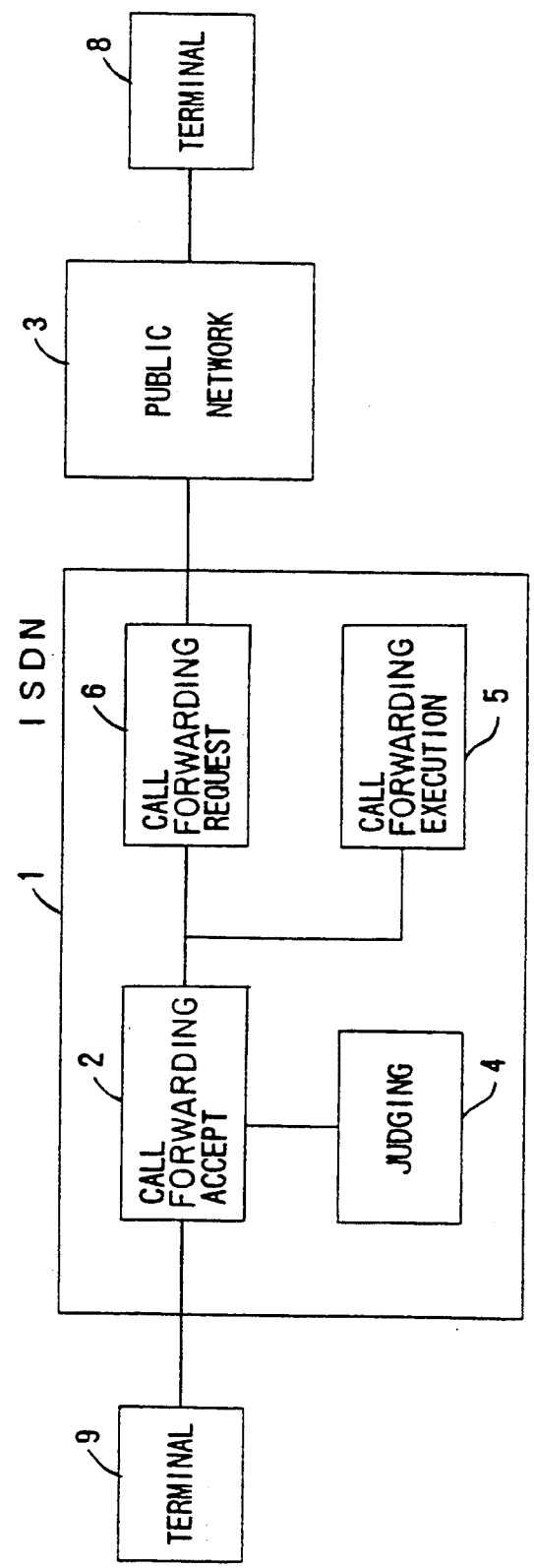
FIG. 4 is a system block diagram for explaining one aspect of the present invention.

In FIG. 4, an ISDN 1 is connected to another network 3. A terminal 8 is connected to the network 3, and a terminal 9 is connected to the ISDN 1. The ISDN 1 includes a call forwarding accept means 2, a judging means 4, a call forwarding execution means 5 and a call forwarding request means 6.

The call forwarding accept means 2 accepts a call forwarding request from the terminal 9 of the ISDN 1. The judging means 4 judges whether the call forwarding request accepted by the call forwarding accept function 2 is a call forwarding request to the ISDN 1 or a call forwarding request to the network 3 which is connected to the ISDN 1. The call forwarding execution means 5 executes the call forwarding to the terminal 9 of the ISDN 1. The call forwarding requests means 6 requests a call forwarding to the terminal 8 of the network 3. Based on the judgement result of the judging means 4, the call forwarding execution means 5 executes the call forwarding to the terminal 9 of the ISDN 1 or, the call forwarding request function 6 requests the call forwarding to the terminal 8 of the network 3.

For example, the call forwarding accept means 2, the judging means 4, the call forwarding execution means 5 and the call forwarding request means 6 may be realized by a keypad protocol and a feature key management protocol which are stimulus protocols.

In addition, the call forwarding accept means 2, the judging means 4, the call forwarding execution means 5 and the call forwarding request function 6 may be realized by a functional protocol.

Figure 1:
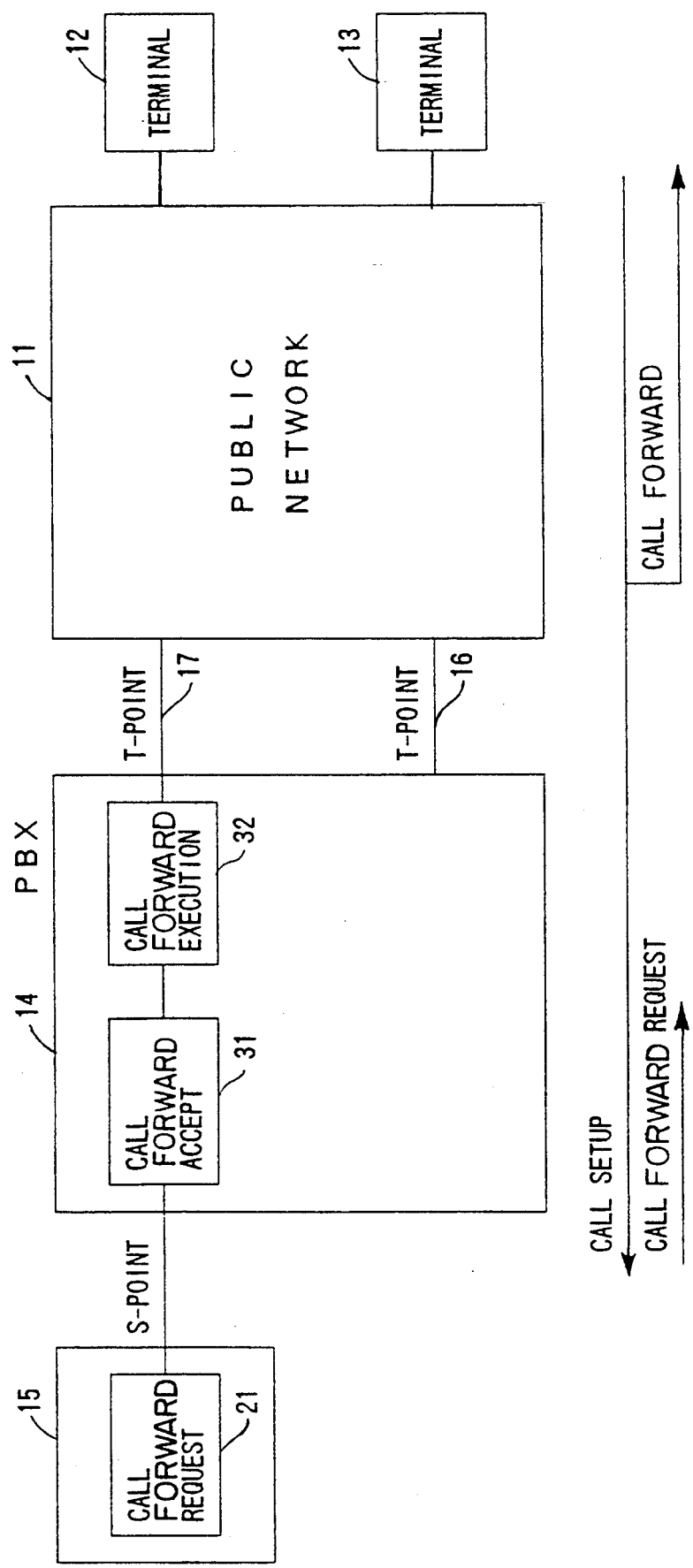
FIG. 1 is a system block diagram for explaining an example of a conventional call forwarding control system.
Figure 5:
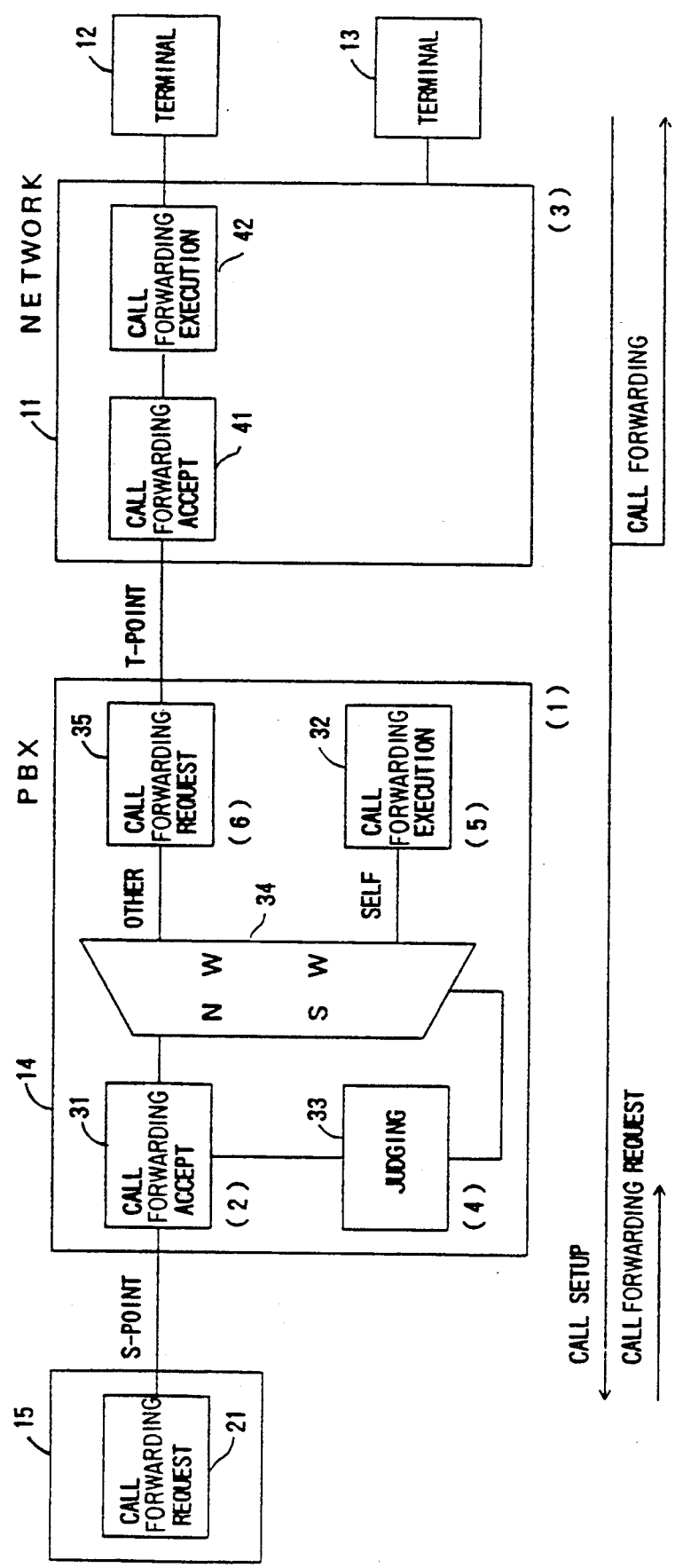
FIG. 5 is a system block diagram for explaining the functions of the present invention shown in FIG. 4.

FIG. 5 shows a block system for explaining the functions of the aspect of the present invention shown in FIG. 4. In FIG. 5, those parts which are the same as those corresponding parts in FIG. 1 are designated by the same reference numerals, and a description thereof will be omitted.

The PBX 14 includes a call forwarding accept part 31, a call forwarding execution part 32, a judging part 33, a network switching part 34 and a call forwarding request part 35. On the other hand, the public network 11 includes a call forwarding accept part 41 and a call forwarding execution part 42.

The judging part 33 judges whether a forwarding destination is the ISDN, that is, the PBX 14, or within another network, that is, a public network 11. The network switching part 34 switches the call forwarding destination for when a call control is to be made. The call forwarding request part 35 includes a call forwarding request function for requesting a call forwarding with respect to the public network 11. The call forwarding accept part 41 accepts the call forwarding and makes a call control depending on the forwarding destination number. The call forwarding execution part 42 calls the terminal 12 or 13 by making a call setup according to the forwarding destination number.

When a call is received from the terminal 12 of the public network 11 and the call forwarding request part 21 of the terminal 15 requests with respect to the PBX 14 a call forwarding to the terminal 13 of the public network 11, the call forwarding accept part 31 of the PBX 14 accepts this call forwarding request. In addition, the judging part 33 judges from the forwarding destination number whether the forwarding destination is the PBX 14 or the public network 11. If the call forwarding destination is the PBX 14, the judging part 34 switches the network switching part 34 to the side of the PBX 14. Thus, the call forwarding execution part 32 deflects the call to the specified terminal of the PBX 14.

On the other hand, if the call forwarding destination is the public network 11, the judging part 33 switches the network switching part 34 to the side of the public network 11. Hence, the call forwarding request part 35 requests a call deflection with respect to the public network 11. As a result, the public network 11 calls the terminal 13 by making a call control depending on the forwarding destination number which is specified by the call forwarding function.

Accordingly, when making the call forwarding with respect to the terminal of the public network 11, the call forwarding is made by the function of the public network 11 at the request from the call forwarding request part 35 of the PBX 14. For this reason, it is unnecessary to use a new information channel at the T-point and no switching control is necessary in the PBX 14 in order to make the call forwarding.

Figure 6:
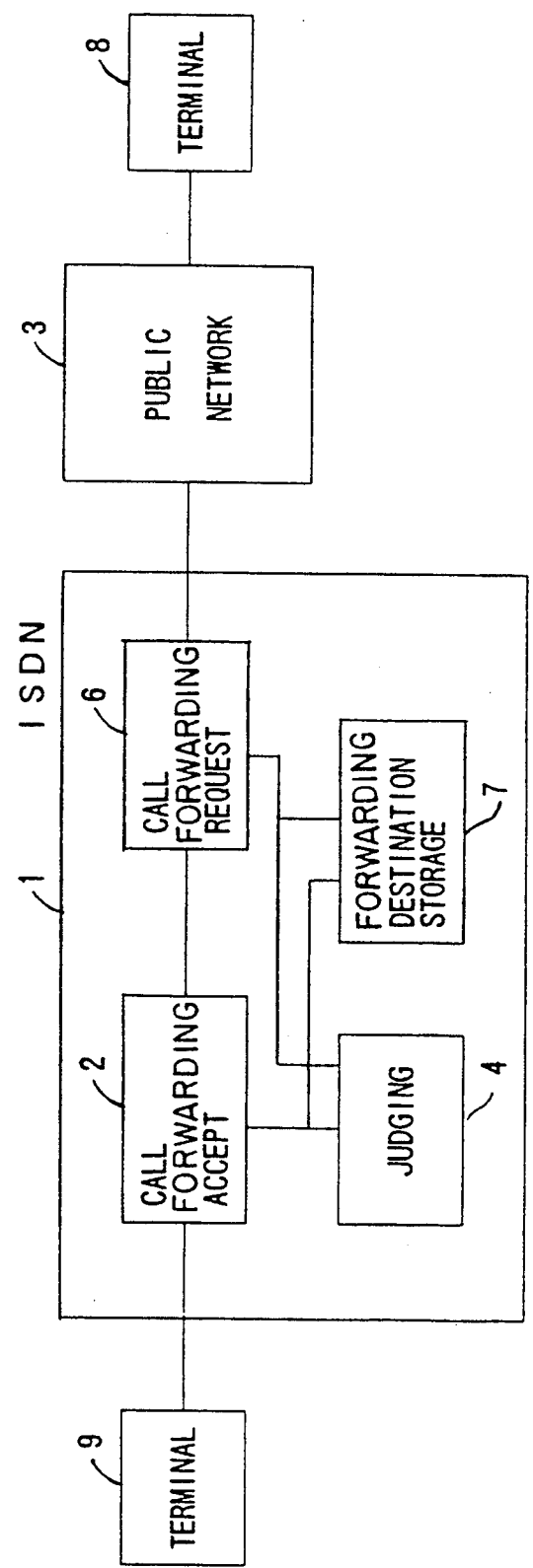
FIG. 6 is a system block diagram for explaining another aspect of the present invention.

Next, a description will be given of another aspect of the present invention, by referring to FIG. 6. In FIG. 6, those parts which are the same as those corresponding parts in FIG. 4 are designated by the same reference numerals, and a description thereof will be omitted.

In FIG. 6, the ISDN 1 includes a forwarding destination storage means 7 for storing a forwarding destination of the public network 3 in response to a maintenance operational command. The call forwarding request means 6 requests the call forwarding to the forwarding destination terminal of the public network 3 stored in the forwarding destination storage means 7 depending on an activate/deactivate instruction from the terminal 9 of the ISDN 1.

Alternatively, the forwarding destination storage means 7 stores a forwarding destination of the public network 3 in response to a maintenance operational command, and the call forwarding request means 6 requests the call forwarding to the forwarding destination terminal of the public network 3 stored in the forwarding destination storage means 7 depending on an activate/-deactivate instruction from an external key of the ISDN 1.

Figure 7:
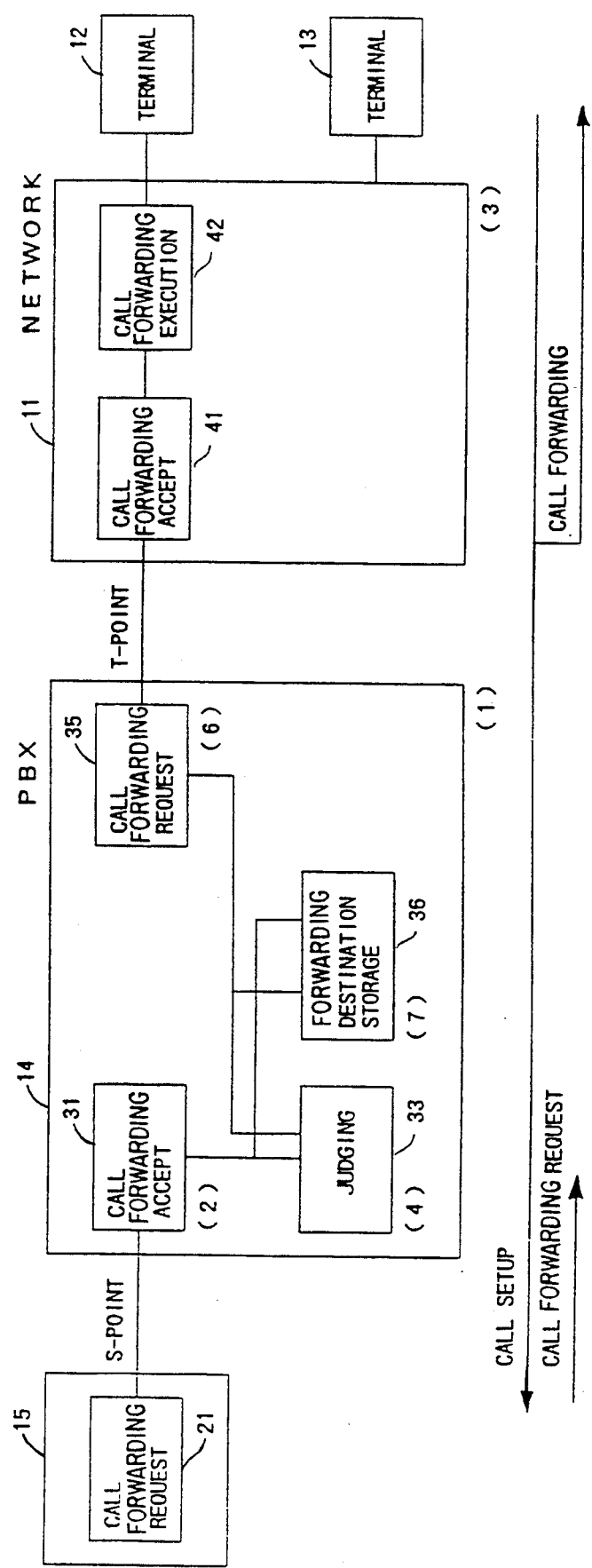
FIG. 7 is a system block diagram for explaining the functions of the present invention shown in FIG. 6.

FIG. 7 shows a block system for explaining the functions of this other aspect of the present invention shown in FIG. 6. In FIG. 7, those parts which are the same as those corresponding parts in FIG. 5 are designated by the same reference numerals, and a description thereof will be omitted.

In FIG. 7, a forwarding destination storage part 36 of the PBX 14 prestores a call forwarding destination of the public network 11.

When a call is received from the terminal 12 of the public network 11 and the call forwarding request part 21 of the terminal 15 requests with respect to the PBX 14 a call forwarding to the terminal 13 of the public network 11, the call forwarding accept part 31 of the PBX 14 accepts this call forwarding request. In addition, the judging part 33 judges whether a call forwarding is activated or deactivated. If the judging part 33 judges that the call forwarding is activated, the judging part 33 activates the forwarding destination storage part 36.

The forwarding destination storage part 36 may store a forwarding destination number which is fixedly registered in advance in correspondence with the terminal, so that this forwarding destination number may be read out from the forwarding destination storage part 36 when needed.

Figure 3:
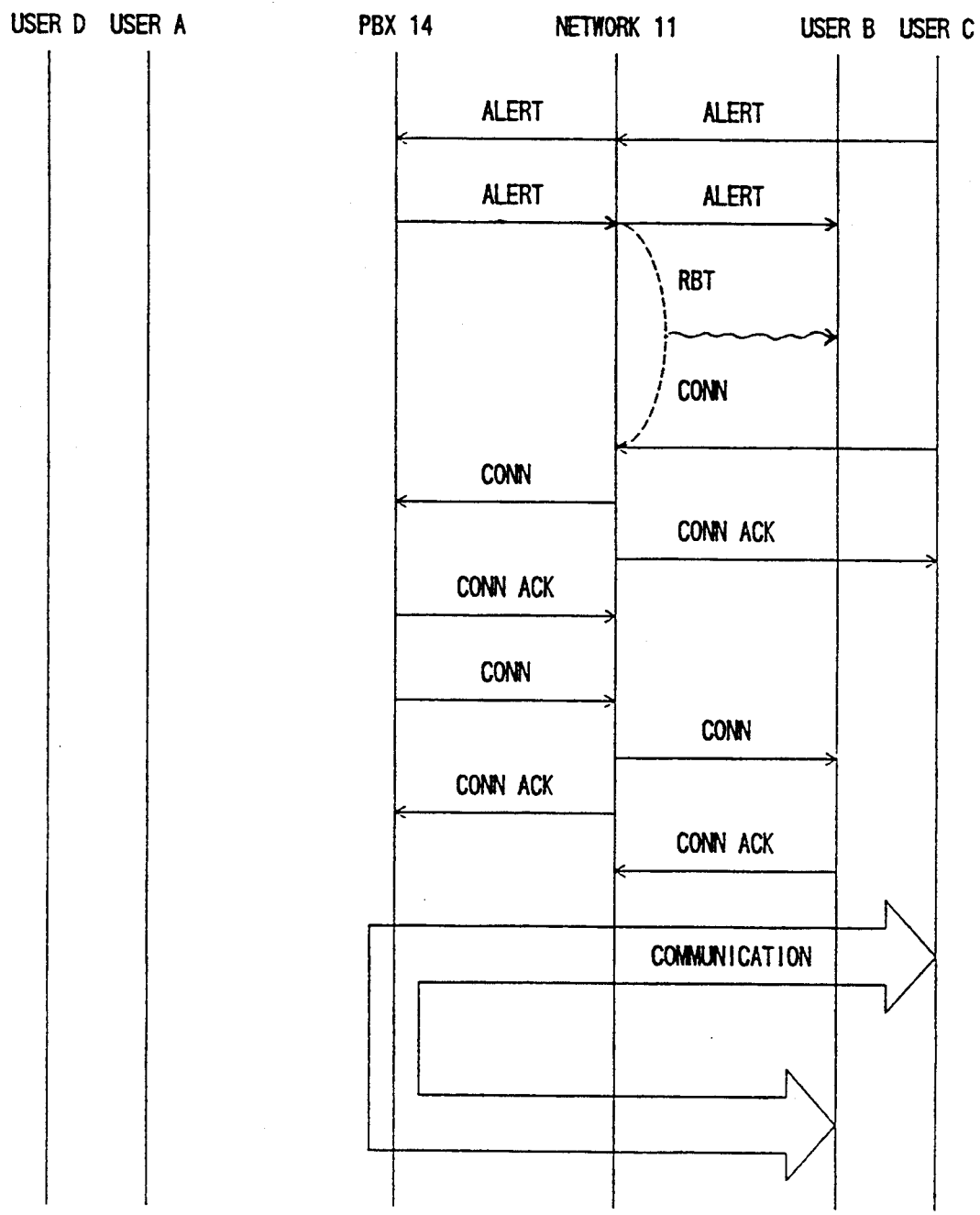
FIG. 3 is a time chart for explaining the operation of the conventional call forwarding control system.

Hence, the call forwarding request part 35 requests a call forwarding with respect to the public network 11 in response to an activate/deactivate instruction from the terminal 15 of the PBX 14, similarly to the case shown in FIG. 3. The public network 11 calls the terminal 13 by making a call control depending on the forwarding destination number which is specified by the call forwarding means of the public network 11. Although the related parts are omitted in FIG. 7, the process is carried out similarly to the case shown in FIG. 5 if the forwarding destination is the PBX 14.

Accordingly, when making the call forwarding with respect to the terminal of the public network 11, the call forwarding is made by the function of the public network 11 at the request from the call forwarding request part 35 of the PBX 14. For this reason, it is unnecessary to use a new information channel at the T-point and no switching control is necessary in the PBX 14 in order to make the call forwarding.

In addition, it is possible to request a call forwarding to the terminal of the public network 11 from the call forwarding request part 35 depending on the maintenance operational command or the activate/deactivate instruction from the external key of the PBX 14.

Figure 8:
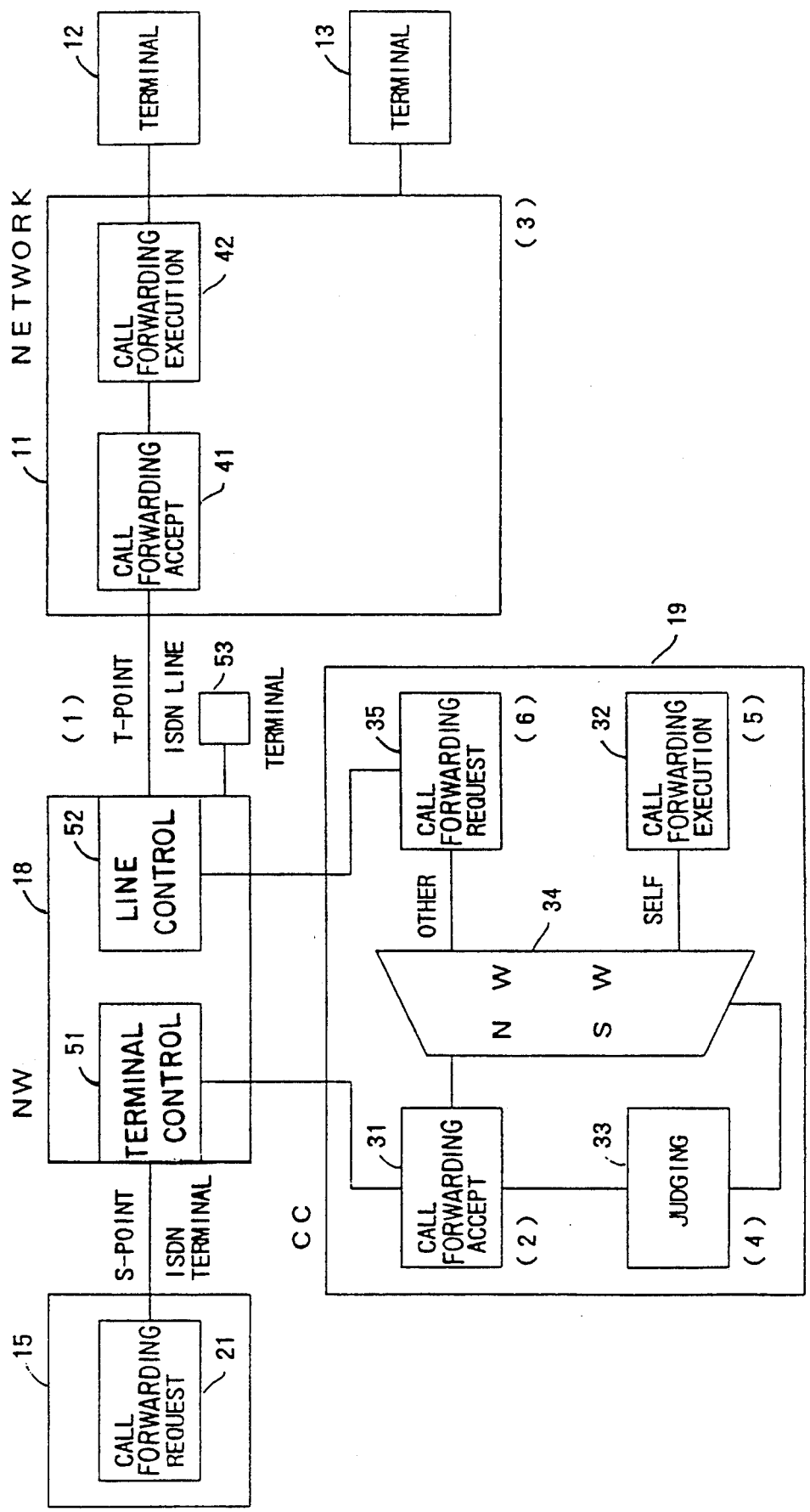
FIG. 8 is a system block diagram showing a first embodiment of a call forwarding control system according to the present invention.

Next, a description will be given of a first embodiment of a call forwarding control system according to the present invention, by referring to FIG. 8. In FIG. 8, those parts which are the same as those corresponding parts in FIGS. 4 and 5 are designated by the same reference numerals, and a description thereof will be omitted. This embodiment utilizes the aspect of the present invention described above in conjunction with FIGS. 4 and 5.

In FIG. 8, a network part 18 and a communication control part 19 form the PBX 14. The network part 18 includes a terminal control part 51 for controlling the connection to the terminal, and a line control part 52 for controlling the connection to the line. A terminal 53 is an example of a terminal other than the terminal 15 that is connected to the PBX 14.

When a call is received from the terminal 12 of the public network 11 and the call forwarding request part 21 of the terminal 15 requests with respect to the PBX 14 a call forwarding to the terminal 13 of the public network 11, the terminal control part 51 of the network part 18 notifies the communication control part 19 of this call forwarding request or, makes the call forwarding request to the communication control part 19. The call forwarding accept part 31 of the communication control part 19 accepts the call forwarding request, and the judging part 33 judges whether or not the forwarding destination is the public network 11 or the PBX 14. If the specified call forwarding destination is the public network 11, the judging part 33 switches the network switching part 34 to the side of the public network 11. Hence, the call forwarding request part 35 in this case requests a call forwarding with respect to the public network 11 via the line control part 52 of the network part 18. Accordingly, the public network 11 makes a call control by its call forwarding function depending on the specified forwarding destination number, and calls the terminal 13. Although omitted in FIG. 8, the process described above with reference to FIG. 5 is carried out if the specified call forwarding destination is the PBX 14.

Figure 9:
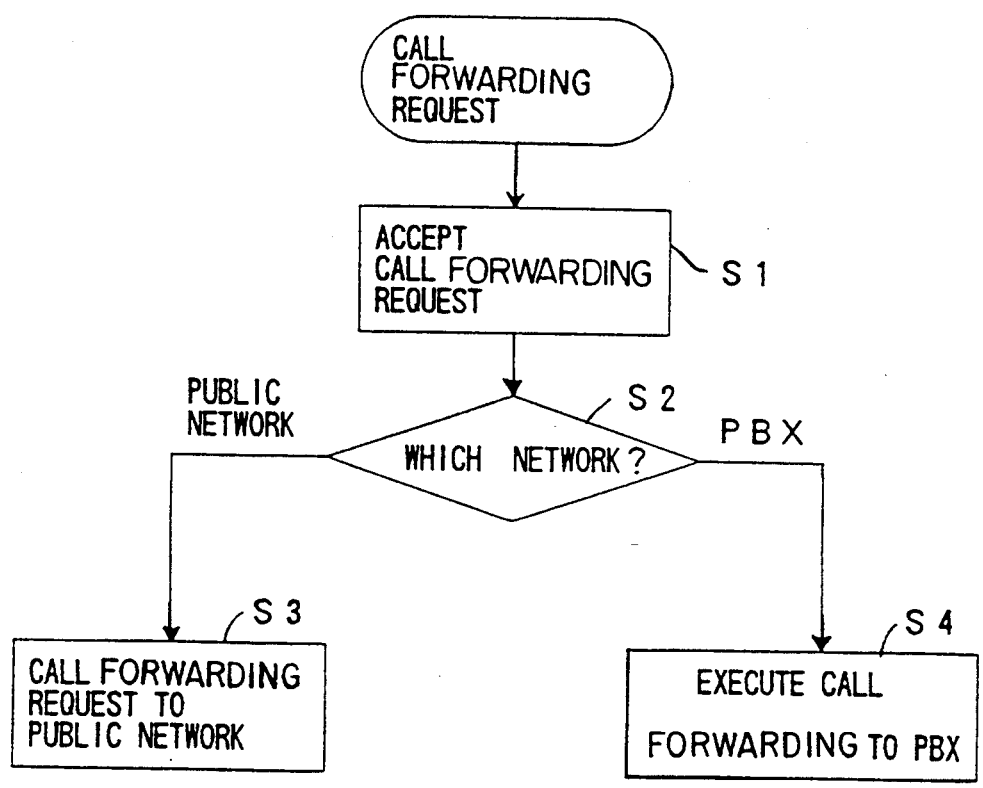
FIG. 9 is a flow chart for explaining the operation of the first embodiment.

The functions of the network part 18 and the communication control part 19 may be realized by an arrangement (not shown) which includes a central processing unit (CPU) and a memory part such as a read only memory (ROM) and a random access memory (RAM) coupled to the CPU. FIG. 9 shows an operation of the CPU of such an arrangement in this embodiment.

In FIG. 9, a step S1 accepts the call forwarding request from the call forwarding request part 21 of the terminal 15. A step S2 decides whether the call forwarding destination specified by the call forwarding request is the public network 11 or the PBX 14. If the public network 11 is specified, a step S3 makes the call forwarding request to the public network 11. On the other hand, a step S4 executes the call forwarding to the PBX 14 if the PBX 14 is specified.

Hence, the step S1 corresponds to the function of the call forwarding accept part 31 of the communication control part 19, and the step S2 corresponds to the function of the judging part 33 of the communication control part 19. The step S3 corresponds to the functions of the network switching part 34 and the call forwarding request part 35 of the communication control part 19, and the step S4 corresponds to the functions of the network switching part 34 and the call forwarding execution part 32 of the communication control part 19.

Next, a description will be given of the operation of this embodiment, by referring to the time charts of FIGS. 10 and 11. The time charts shown in FIGS. 10 and 11 show the procedure of the general point-to-multi-point connection interface.

Figure 10:
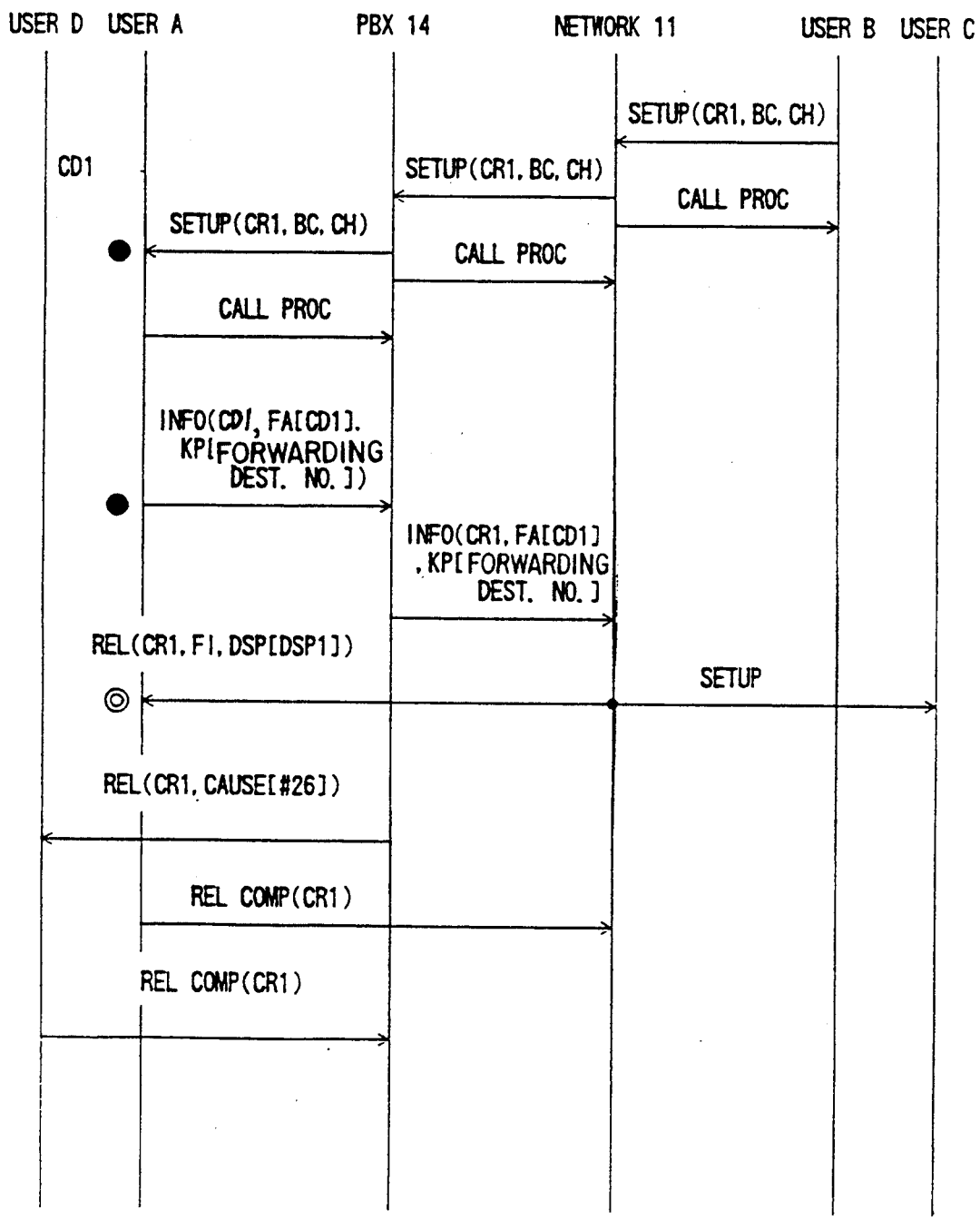
FIG. 10 is a time chart for explaining the operation of the first embodiment.
Figure 11:
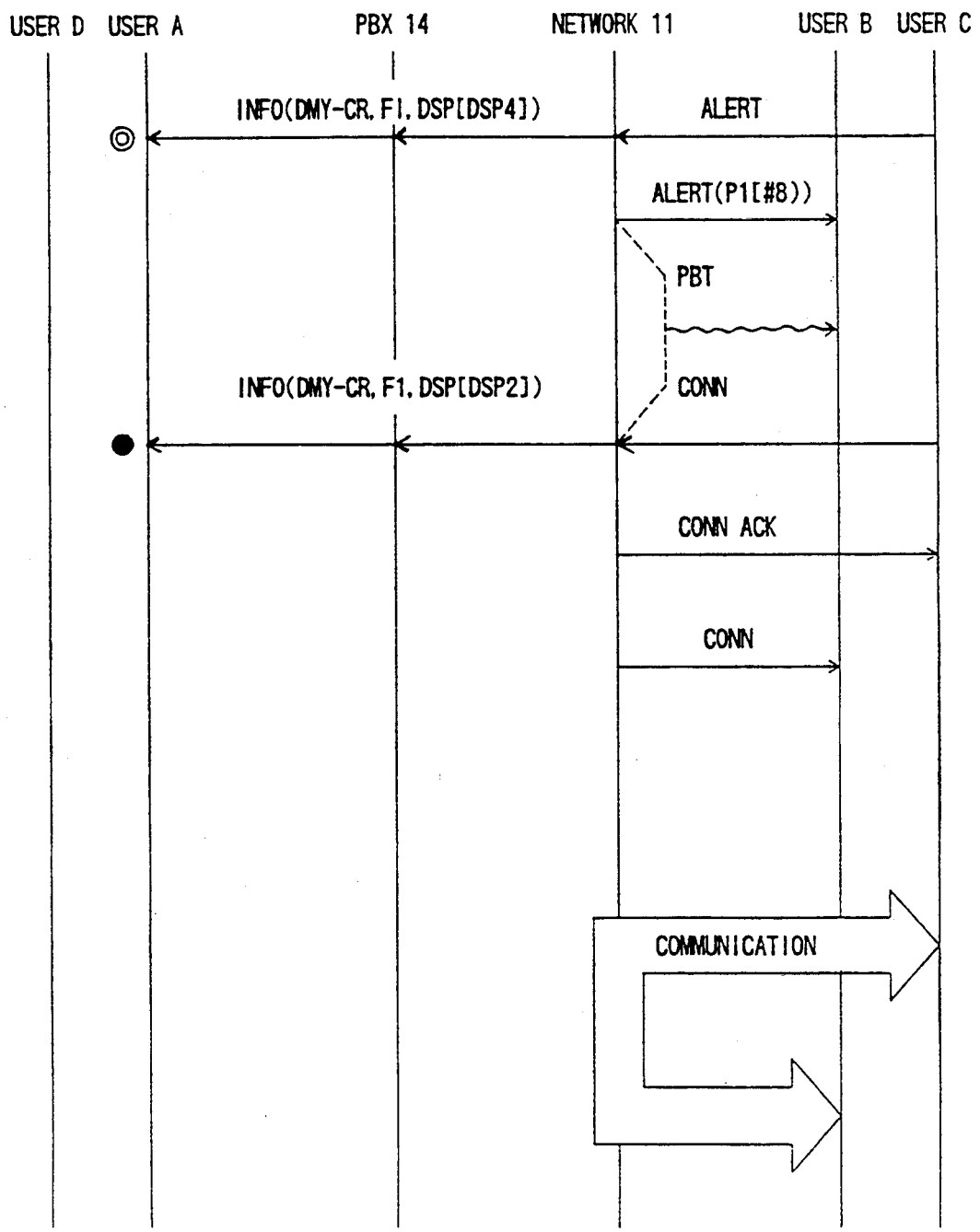
FIG. 11 is a time chart for explaining the operation of the first embodiment.

First, if a user B of the public network 11 calls a user A at an extension of the PBX 14, a call setup (SETUP) is sent from the user B to the user A via the public network 11 and the PBX 14 as shown in FIG. 10. The call setup (SETUP) includes a call reference number (CR1), a bearer capability (BC) and a channel number (CH). The public network 11 returns a call proceeding (CALL PROC) to the user B in response to the call setup (SETUP). The PBX 14 returns a call proceeding (CALL PROC) to the public network 11 in response to the call setup (SETUP). In addition, the user A returns a call proceeding (CALL PROC) to the PBX 14 in response to the call setup (SETUP).

Second, the user A generates a call forwarding (CD1), that is, a call forwarding request. If a call forwarding is to be made to a user C, the user A sends an added information message (INFO) which includes a feature activation information element (FA[CD1]) and a keypad information element (KP[forwarding destination number]), so as to activate the call forwarding (CD1) with respect to the PBX 14. In FIGS. 10 and 11, a black circle indicates the inactive state in which the call forwarding feature lamp is OFF, and a pair of overlapping circles indicates executing state in which the call forwarding feature lamp slowly flashes. The user A sends the added information message (INFO) to the PBX 14 by adding the call reference number, the service request (FA[CD1]) of the call forwarding and the keypad number (KP), that is, the forwarding destination number. The PBX 14 sends the received added information message (INFO) to the public network 11.

Third, the public network 11 sends a call setup (SETUP) to the user C, and sends to the user A a release message (REL) by adding the call reference number, the feature indication (FI) and the call forwarding display (DSP[DSP1]), where DSP denotes a display information element, DSP1 denotes a display information field, and the content of the display information field DSP1 is "starting forwarding", for example. The user A assumes the executing state (that is, slow flashing of the call forwarding feature lamp) in response to the release message (REL). In addition, the PBX 14 sends a release message (REL) to a user D who is other than the user A by adding the call reference number and a disconnect/restoration cause (CAUSE [#26]) of the user who was not selected. The user A returns a release complete (REL COMP) to the public network 11 by adding the call reference number. Further, the user D who is other than the user A also returns a release complete (REL COMP) to the PBX 14 by adding the call reference number.

Fourth, the user C sends an alert (ALERT) to the public network 11 as shown in FIG. 11. Hence, the public network 11 sends an added message (INFO) to the user A by adding a dummy call reference number (DMY-CR1), the feature indication and a remote end calling display instruction (DSP[DSP4]), where DSP4 denotes a display information field having a content "calling remote end", for example. In addition, the public network 11 sends an alert (ALERT) to the user B by adding a process indicator (PI[#8]) which indicates that the remote end terminal is being called, where PI denotes a process indicator and an in-band signal or an appropriate pattern can be used therefor. At the same time, the public network 11 sends a ring back tone (RBT) to the user B.

Fifth, if the user C lifts the receiver and a connection is made, a connect (CONN) is returned to the public network 11. Hence, the public network 11 sends to the user A an added message (INFO) which is added with a dummy call reference number, a feature indication, and a forwarding complete display instruction (DSP[DSP2]), where DSP2 indicates a display state field having a content "call forwarding completed", for example.

Sixth, the public network 11 returns an acknowledge (CONN ACK) to the user C when the connection is completed. In addition, the public network 11 sends a connect (CONN) to the user B to notify that the connection for the forwarding has been made. Thereafter, a communication is made between the users B and C via the public network 11.

Figure 2:
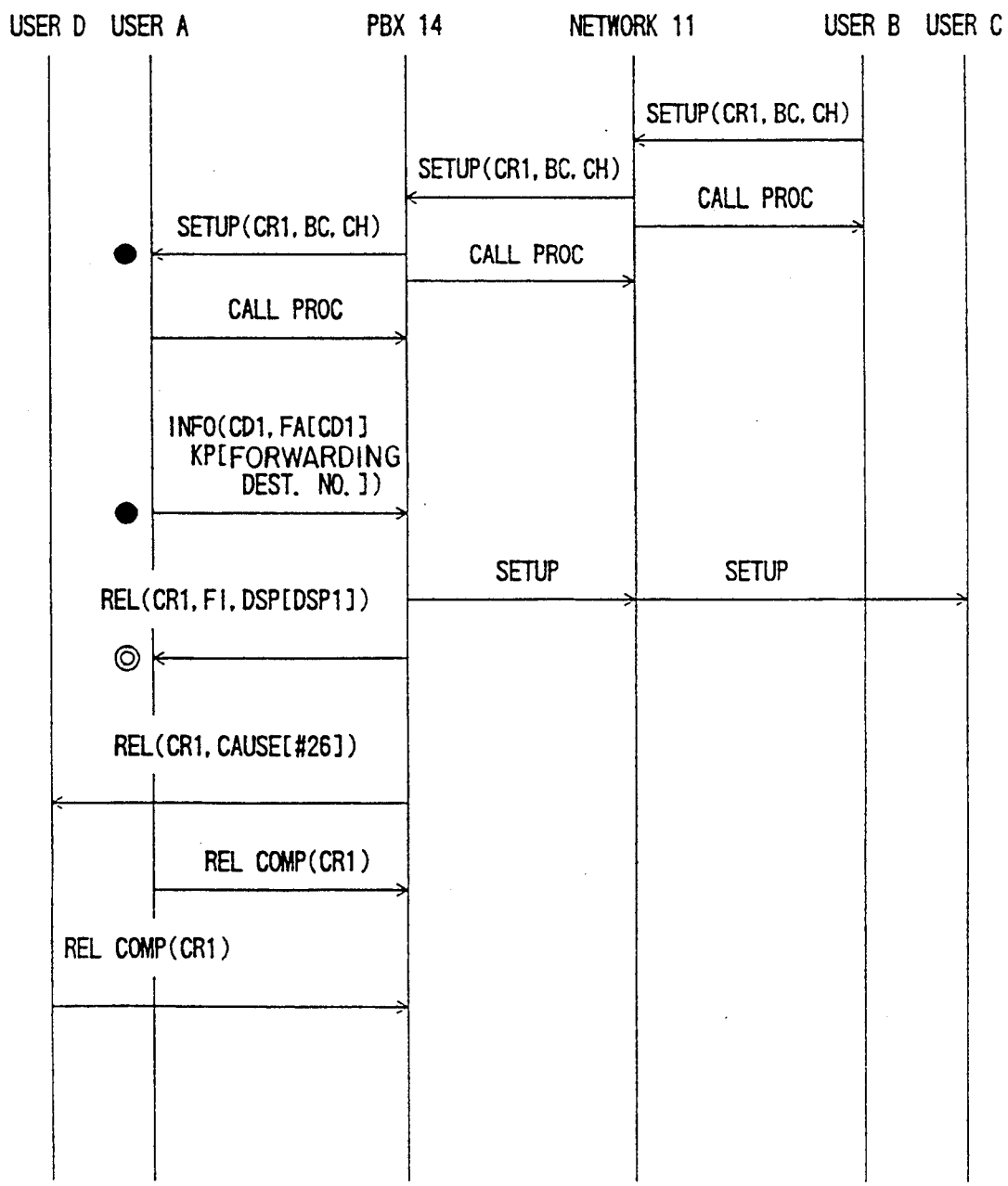
FIG. 2 is a time chart for explaining the operation of the conventional call forwarding control system.

Therefore, unlike the conventional call forwarding control system described with reference to FIGS. 2 and 3, it may be seen from FIGS. 10 and 11 that this embodiment is provided with means for turning OFF the call forwarding feature lamp at the user A and means for notifying the completion of the call forwarding to the user A. The sending of the added message (INFO) from the public network 11 to the user A via the PBX 14 realizes such means, and the PBX 14 does not require special function but simply needs to send the added message (INFO) from the public network 11 as it is to the user A.

In the case of point-to-point connection interface and not the point-to-multi-point connection interface, there is no non-selected terminal release procedure. In addition, the cause procedure is activated by the disconnect (DISC) message and not the release (REL).

In the above described service, the functions of the call forwarding accept part 31, the judging part 33, the call forwarding execution part 32 and the call forwarding request part 35 can be realized by the feature key management protocol and the keypad protocol which are stimulus protocols.

In other words, if a request for a service is made by the feature key management protocol from a request button or the like of the terminal, for example, the physical information is converted into logical information, and the PBX 14 carries out a control by reading the logical information. When displaying the control result, the logical information is converted into the physical information such as the lamp number. In addition, the forwarding destination is specified by the keypad protocol by sending the call forwarding destination number.

Furthermore, in the above described service, the functions of the call forwarding accept part 31, the judging part 33, the call forwarding execution part 32 and the call forwarding request part 35 can be realized by the functional protocol.

In other words, all of the functions of the call forwarding accept part 31, the judging part 33, the call forwarding execution part 32 and the call forwarding request part 35 can be realized by the functional protocol through exchange of messages. For example, the service request from the request button or the like of the terminal is executed by generating the message and sending the message to the PBX 14. The display of the control result from the PBX 14 is also made by sending the message to the terminal and making the display at the terminal by interpreting the message.

Figure 12:
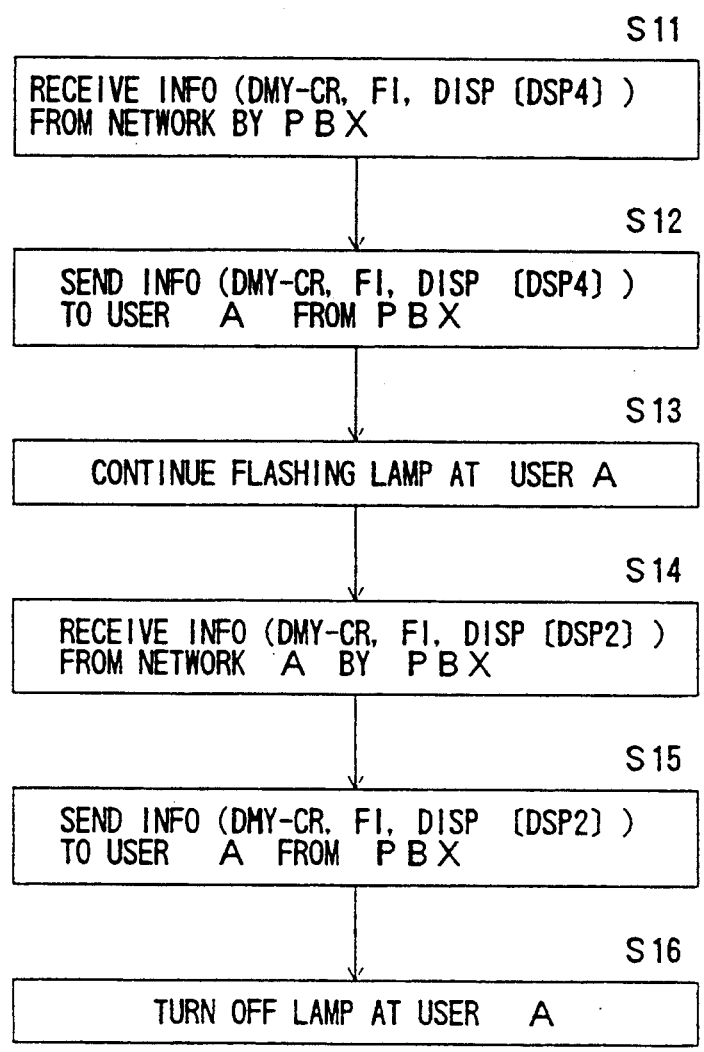
FIG. 12 is a flow chart for explaining the signal processing of the first embodiment.

FIG. 12 is a flow chart for explaining the signal processing of the first embodiment corresponding to the signal sequence related to the added message (INFO) shown in FIG. 11.

In FIG. 12, when the user C sends the alert (ALERT) to the public network 11 as shown in FIG. 11, the PBX 14 in a step S11 receives the added message (INFO) which is sent from the public network 11 and is added with the dummy call reference number (DMY-CR1), the feature indication and the remote end calling display instruction (DSP[DSP4]), where DSP4 denotes the display information field having the content "calling remote end", for example. The PBX 14 in a step S12 sends this added message (INFO) from the public network 11, as it is, to the user A. In addition, the PBX 14 in a step S13 continues to blink the call forwarding feature lamp at the user A.

On the other hand, after the user C lifts the receiver and the connection is made and the connect (CONN) is returned to the public network 11, the PBX 14 in a step S14 receives the added message (INFO) which is sent from the public network 11 and is added with the dummy call reference number, the feature indication, and the forwarding complete display instruction (DSP[DSP2]), where DSP2 indicates the display state field having the content "call forwarding completed", for example. The PBX 14 in a step S15 sends this added message (INFO) from the public network 11, as it is, to the user A. In addition, the PBX 14 in a step S16 turns OFF the call forwarding feature lamp at the user A.

In this embodiment, no special signal sequence is required of the public network 11. In other words, the public network 11 does not require a special function and the operation of this embodiment can be supported by the originally existing functions of the public network 11. This is evident from a comparison of the signal sequence shown in FIGS. 10 and 11 and the conventional signal sequence shown in FIG. 13.

Figure 13:
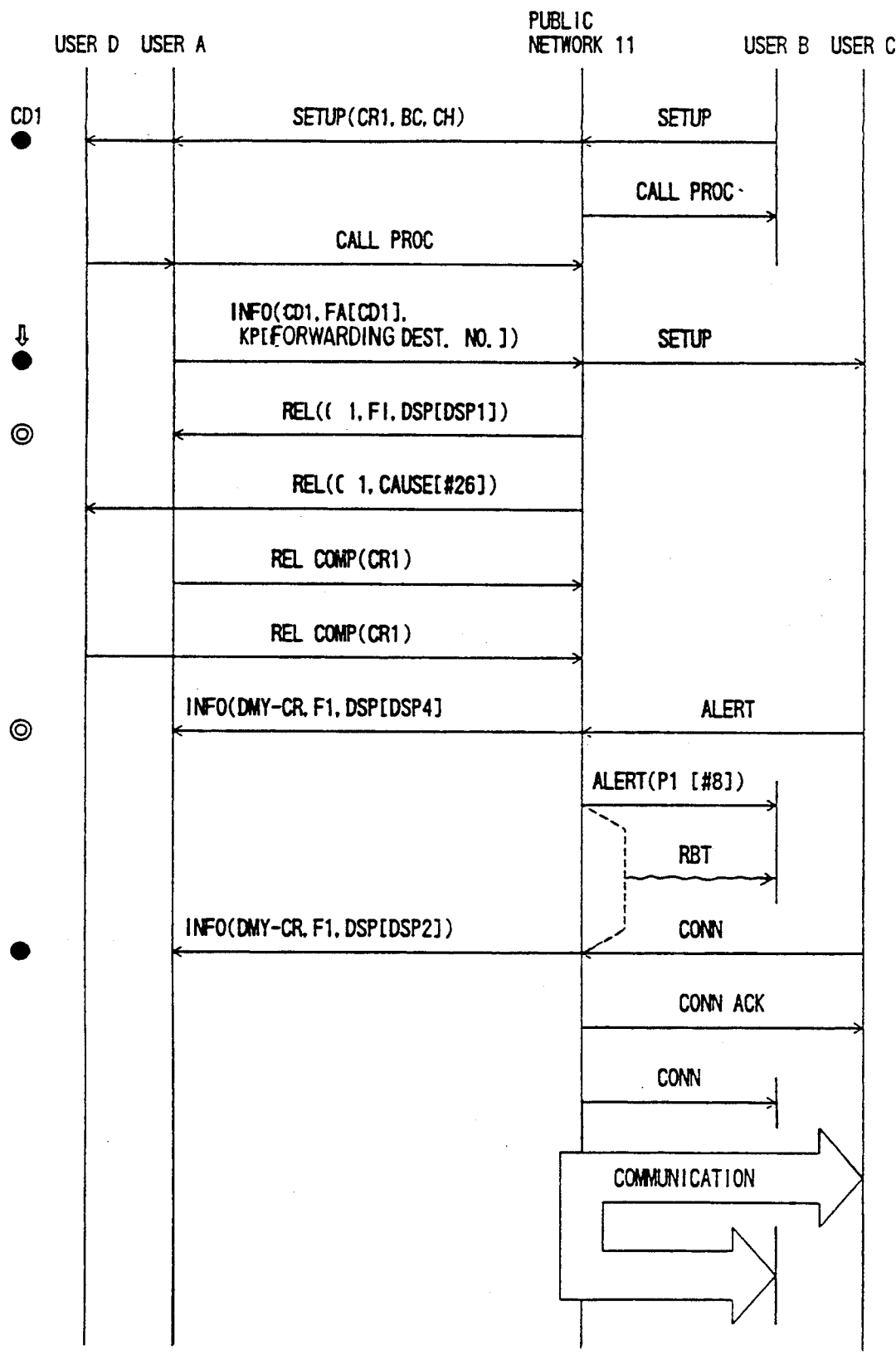
FIG. 13 is a time chart for explaining the operation of a public network.

FIG. 13 shows the signal sequence when making the same call forwarding as in FIGS. 10 and 11, that is, when forwarding the call from the user B to the user C via the public network and the user A in a normal public network system having no PBX. In other words, the users A, B, C and D in FIG. 13 are all connected to the public network 11 and no PBX is interposed therebetween. In FIG. 13, the same signal designations are used as in FIGS. 10 and 11.

First, if the user B of the public network 11 calls the user A of the public network 11, a call setup (SETUP) is sent from the user B to the user A (and the user D) via the public network 11 as shown in FIG. 13. The call setup (SETUP) includes a call reference number (CR1), a bearer capability (BC) and a channel number (CH). The public network 11 also returns a call proceeding (CALL PROC) to the user B in response to the call setup (SETUP).

Second, the user A generates a call forwarding (CD1), that is, a call deflection request. If a call forwarding is to be made to the user C, the user A sends an added information message (INFO) which includes a feature activation information element (FA[CD1]) and a keypad information element (KP[forwarding destination number]), so as to activate the call forwarding (CD1) with respect to the public network 11. The user A sends the added information message (INFO) to the public network 11 by adding the call reference number, the service request (FA[CD1]) of the call forwarding and the keypad number (KP), that is, the forwarding destination number.

Third, the public network 11 sends a call setup (SETUP) to the user C, and sends to the user A a release message (REL) by adding the call reference number, the feature indication (FI) and the call forwarding display (DSP[DSP1]), where DSP denotes a display information element, DSP1 denotes a display information field, and the content of the display information field DSP1 is "starting forwarding", for example. The user A assumes the executing state (that is, slow flashing of the call deflection feature lamp) in response to the release message (REL). In addition, the public network 11 sends a release message (REL) to the user D who is other than the user A by adding the call reference number and a disconnect/restoration cause (CAUSE [#26]) of the user who was not selected. The user A returns a release complete (REL COMP) to the public network 11 by adding the call reference number. Further, the user D who is other than the user A also returns a release complete (REL COMP) to the public network 11 by adding the call reference number.

Fourth, the user C sends an alert (ALERT) to the public network 11. Hence, the public network 11 sends an added message (INFO) to the user A by adding a dummy call reference number (DMY-CR1), the feature indication and a remote end calling display instruction (DSP[DSP4]), where DSP4 denotes a display information field having a content "calling remote end", for example. In addition, the public network 11 sends an alert (ALERT) to the user B by adding a process indicator (PI[#8]) which indicates that the remote end terminal is being called, where PI denotes a process indicator and an in-band signal or an appropriate pattern can be used therefor. At the same time, the public network 11 sends a ring back tone (RBT) to the user B.

Fifth, if the user C lifts the receiver and a connection is made, a connect (CONN) is returned to the public network 11. Hence, the public network 11 sends to the user A an added message (INFO) which is added with a dummy call reference number, a feature indication, and a forwarding complete display instruction (DSP[DSP2]), where DSP2 indicates a display state field having a content "call forwarding completed", for example.

Sixth, the public network 11 returns an acknowledge (CONN ACK) to the user C when the connection is completed. In addition, the public network 11 sends a connect (CONN) to the user B to notify that the connection for the forwarding has been made. Thereafter, a communication is made between the users B and C via the public network 11.

Figure 14:
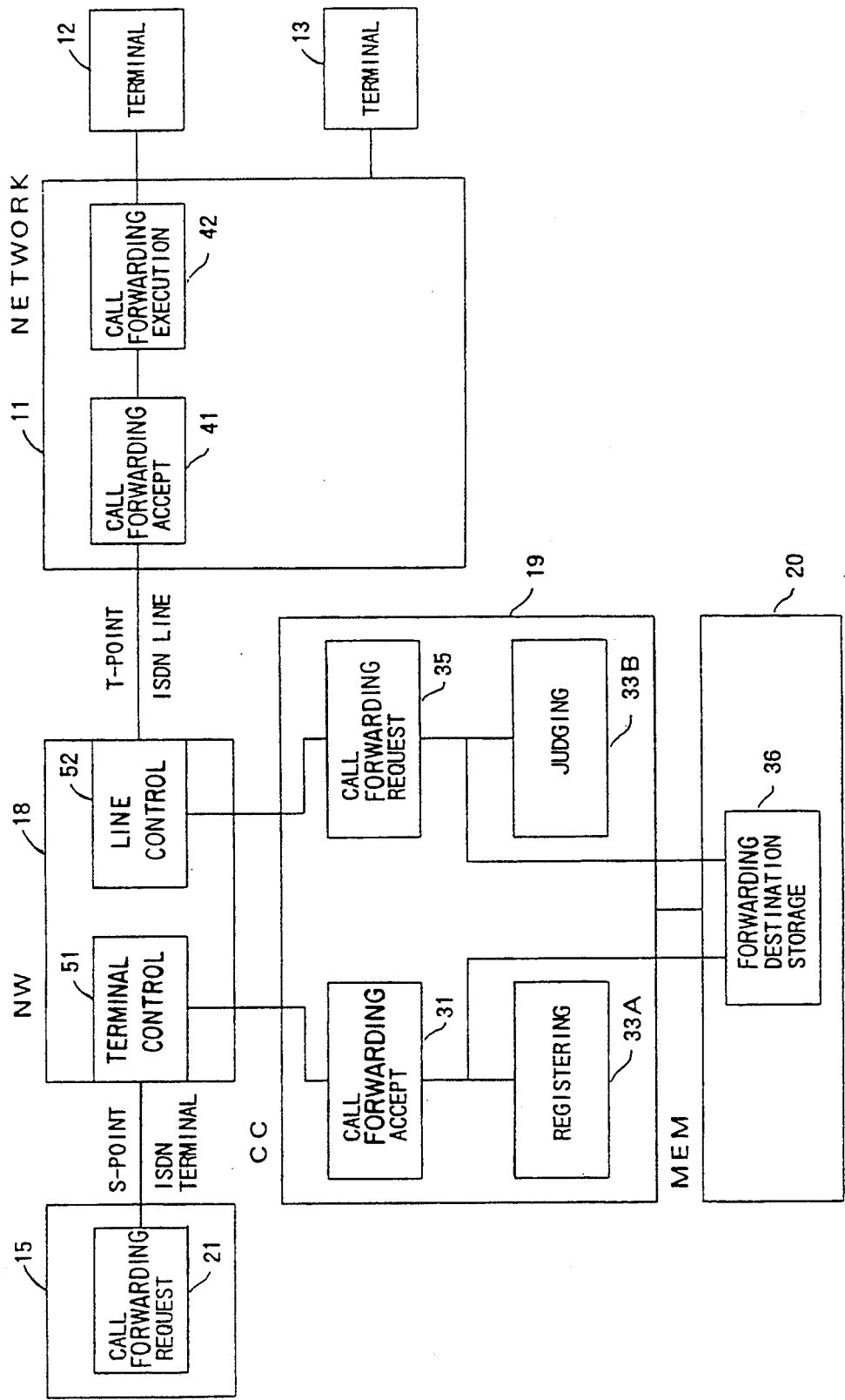
FIG. 14 is a system block diagram showing a second embodiment of the call forwarding control system according to the present invention.

Next, a description will be given of a second embodiment of the call forwarding control system according to the present invention, by referring to FIG. 14. In FIG. 14, those parts which are the same as those corresponding parts in FIGS. 6, 7 and 8 are designated by the same reference numerals, and a description thereof will be omitted. This embodiment utilizes the aspect of the present invention described above in conjunction with FIGS. 6 and 7.

In this embodiment, the communication control part 19 includes a call forwarding accept part 31, a call forwarding request part 35, an activate/deactivate registering part 33A, and an activate/deactivate judging part 33B. In addition, a memory unit 20 includes a forwarding destination storage part 36.

If the judging part 33B judges that the forwarding destination is the public network 11, the judging part 33B reads out the forwarding destination number from the forwarding destination storage part 36 of the memory unit 20 in response to an activate/deactivate instruction from the terminal 15. The call forwarding request part 35 requests the call forwarding with respect to the public network 11 via the line control part 52 of the network part 18 based on the forwarding destination number which is read out from the forwarding destination storage part 36 of the memory unit 20.

For example, the registering part 33A fixedly registers the forwarding destination numbers in advance in correspondence with the terminals, by storing the forwarding destination numbers into the forwarding destination storage part 36 based on a maintenance operational command.

The setting of the forwarding destination storage part 36 by the maintenance operational command may be made by a push-button protocol or a dialing operation from a telephone set, for example.

Alternatively, the judging part 33B may read out the forwarding destination number from the forwarding destination storage part 36 in response to the activate/deactivate instruction which is made by the maintenance operational command or the external key of the PBX 14. In this case, the control of the call forwarding request to the public network 11 is activated/deactivated by inputting the maintenance operational command with respect to the PBX 14 from the console or, setting the key (or switch) within the PBX 14.

Figure 15:
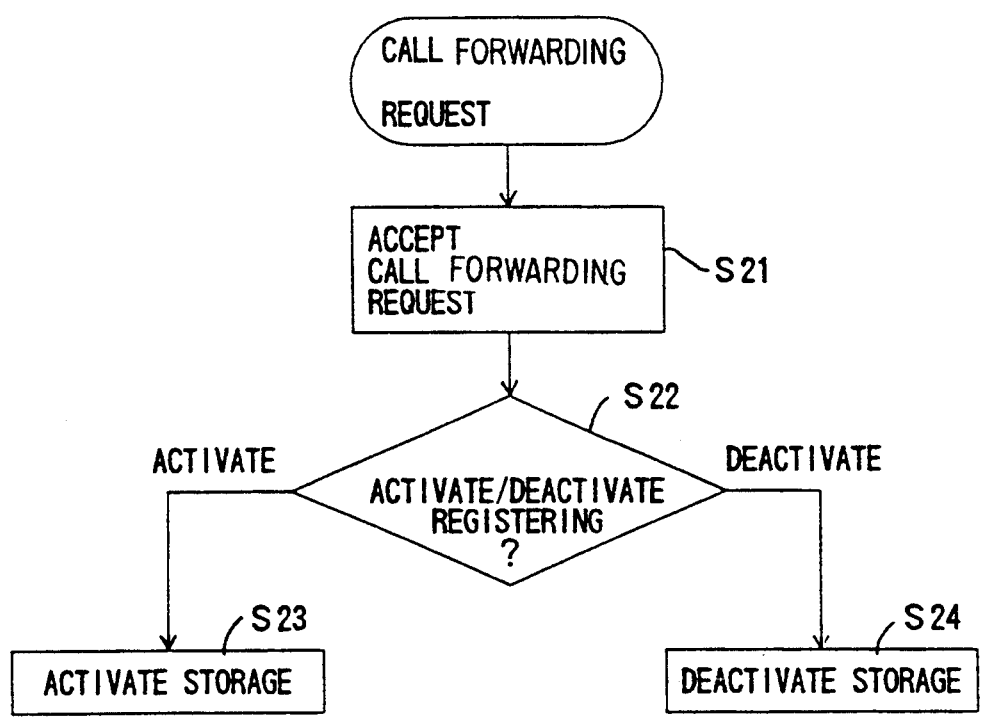
FIG. 15 is a flow chart for explaining the operation of the second embodiment.

The functions of the network part 18 and the communication control part 19 may be realized by an arrangement (not shown) which includes a central processing unit (CPU) and a memory part such as a read only memory (ROM) and a random access memory (RAM) coupled to the CPU. FIG. 15 shows an operation of the CPU of such an arrangement in this embodiment.

In FIG. 15, a step S21 accepts the call forwarding request from the call forwarding request part 21 of the terminal 15. A step S22 decides whether the registration of the forwarding destination specified by the call forwarding request is activated or deactivated. If the registration is activated, a step S23 activates the forwarding destination storage part 36 of the memory unit 20 and registers the forwarding destination by storing the forwarding destination into the forwarding destination storage part 36. On the other hand, if the registration is deactivated, a step S24 deactivates the forwarding destination storage part 36.

Hence, the step S21 corresponds to the function of the call forwarding accept part 31 of the communication control part 19, and the steps S22, S23 and S24 correspond to the functions of the registering part 33A of the communication control part 19.

Figure 16:
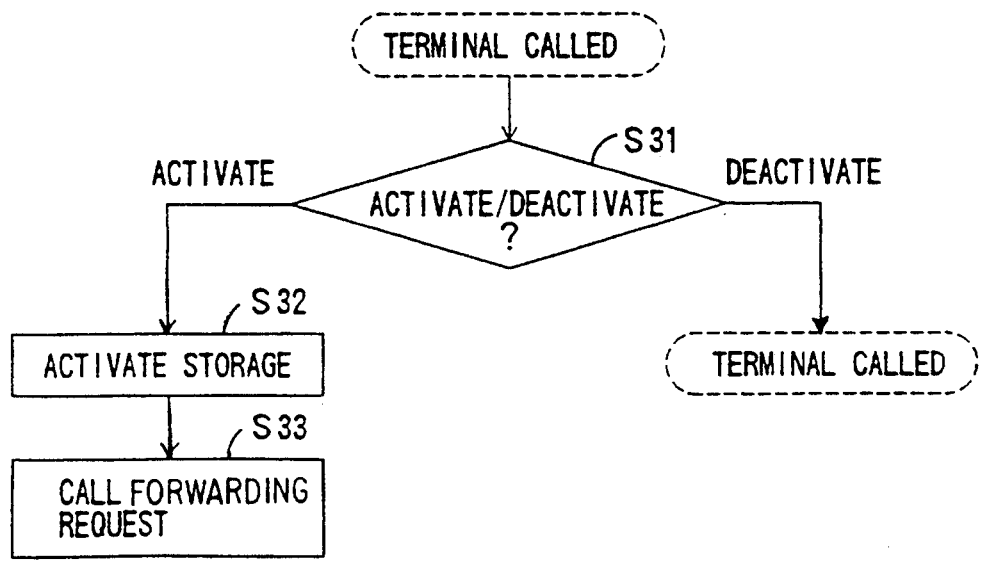
FIG. 16 is a flow chart for explaining the operation of the second embodiment.

FIG. 16 shows another operation of the CPU of the above described arrangement in this embodiment.

In FIG. 16, if the terminal 15 of the PBX 14 is called, a step S31 decides whether the call forwarding is activated or deactivated. If the call forwarding is activated, a step S32 activates the forwarding destination storage part 36 of the memory unit 20 and reads out the forwarding destination number from the forwarding destination storage part 36. In addition, a step S33 makes the call forwarding request based on the read out forwarding destination number. On the other hand, if the call forwarding is deactivated, the called terminal 15 simply continues its operation which is normally carried out when called.

Hence, the steps S31 and S32 correspond to the functions of the judging part 33B of the communication control part 19, and the step S33 corresponds to the function of the call forwarding request part 35 of the communication control part 19.

Further, the present invention is not limited to these embodiments, but various variations and modifications may be made without departing from the scope of the present invention.

What is claimed is:

1. A call forwarding control system for use in a communication system which includes at least two terminals connected to a first network and at least two terminals connected to a second network which is coupled to the first network, said second network being an integrated services digital network and said first network being a public switched telephone network, said call forwarding control system being in said second network, and comprising:

- a call forwarding accept means accepting a call forwarding request from a terminal of the second network upon that terminal receiving a call from a terminal of the first network;
- judging means, coupled to said call forwarding accept means for judging whether the call forwarding request accepted by said call forwarding accept means is a call forwarding request to a terminal of the first or second network;
- call forwarding execution means coupled to said judging means for executing a call forwarding to a terminal in the second network when said judging means determines that the forwarding request is to a terminal of the second network; and
- a call forwarding request means coupled to said call forwarding accept means for requesting the first network to execute the call forwarding when the judging means determines that the forwarding request is to a terminal of the first network.

2. The call forwarding control system as claimed in claim 1, wherein the second network includes a private branch exchange.

3. The call forwarding control system as claimed in claim 1, wherein said call forwarding accept means, said judging means, said call forwarding request means and said call forwarding execution means are implemented through a feature key management protocol and a keypad protocol.

4. The call forwarding control system as claimed in claim 1, wherein said call forwarding accept means, said judging means, said call forwarding request means and said call forwarding execution means are implemented by a functional protocol.

5. The call forwarding control system as claimed in claim 1, wherein said call forwarding request means includes means for forwarding a call addressed to a called terminal of the second network and originating from a terminal of the first network, the call being forwarded to another terminal of the first network, by using a channel between the two terminals of the first network via the first network and excluding the second network.

6. The call forwarding control system as claimed in claim 1, which further comprises storage means for storing a forwarding destination of the first network in response to a maintenance operational command originating in the second network, and said call forwarding request means requests the call forwarding to the forwarding destination which is read out from said storage means in response to an activate instruction from a terminal of the second network.

7. The call forwarding control system as claimed in claim 1 which further comprises storage means for storing a forwarding destination of the first network in response to a maintenance operational command originating within the second network, and said call forwarding request means, requests the call forwarding to the forwarding destination which is read out from said storage means in response to one of a maintenance operational command from said second network and an activate instruction from an external key in said second network.

8. The call forwarding control system as claimed in claim 5, wherein the channel between the two terminals of the first network excludes an information channel on a T-point side of the second network.

9. The call forwarding control system as claimed in claim 5, wherein said call forwarding request means further includes notifying means for notifying the called terminal of the second network of a completion of the call forwarding.

10. The call forwarding control system as claimed in claim 9, wherein said notifying means notifies the called terminal of the second network of the completion of the call forwarding by a message which is received from the first network and sent as it is to the called terminal of the second network.

11. The call forwarding control system as claimed in claim 10, wherein the first network originally includes the capability of forwarding messages.

* * * * *